United States Patent [19]

Lycan

[11] 4,165,566

[45] Aug. 28, 1979

[54] OFFSET GAGING DEVICE INCORPORATING A DEPTH MEASURE FOR BORES OR SHOULDERS

[76] Inventor: Goodwin A. Lycan, P.O. Box 23, Stevensville, Mich. 49127

[21] Appl. No.: 896,807

[22] Filed: Apr. 17, 1978

[51] Int. Cl.² ............................ G01B 3/20; G01B 3/28
[52] U.S. Cl. ................................... 33/174 R; 33/169 B
[58] Field of Search ............ 33/143 M, 143 J, 143 K, 33/169 R, 169 B, 174 R

[56] References Cited

U.S. PATENT DOCUMENTS

| 1,329,911 | 2/1920 | Lenti | 33/143 M |
|---|---|---|---|
| 2,175,650 | 10/1939 | Schaber | 33/169 B |
| 2,895,225 | 7/1959 | Eisele | 33/143 M |
| 3,869,801 | 3/1975 | Lycan | 33/174 R |

FOREIGN PATENT DOCUMENTS

| 60201 | 4/1954 | France | 33/143 J |
|---|---|---|---|
| 253742 | 3/1948 | Switzerland | 33/143 M |

*Primary Examiner*—Richard R. Stearns
*Attorney, Agent, or Firm*—Oltsch, Knoblock & Hall

[57] ABSTRACT

A gage including parallel first and second bar members having mutually engaging side faces and including contact end portions for engagement with structural members wherein the offset of such structural members will be indicated by the relative longitudinal position of the bar members. One of the bar members includes a bore having a pin therein which can be made to protrude a selected distance from the end face of the bar to indicate the depth of a bore as measured from the bar end face.

7 Claims, 7 Drawing Figures

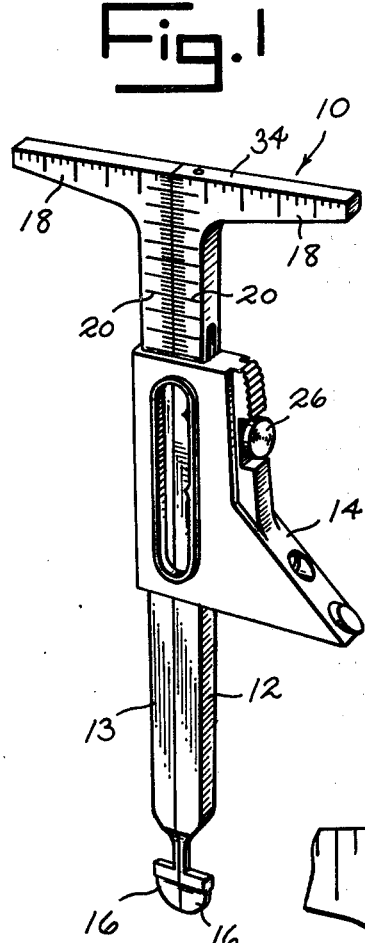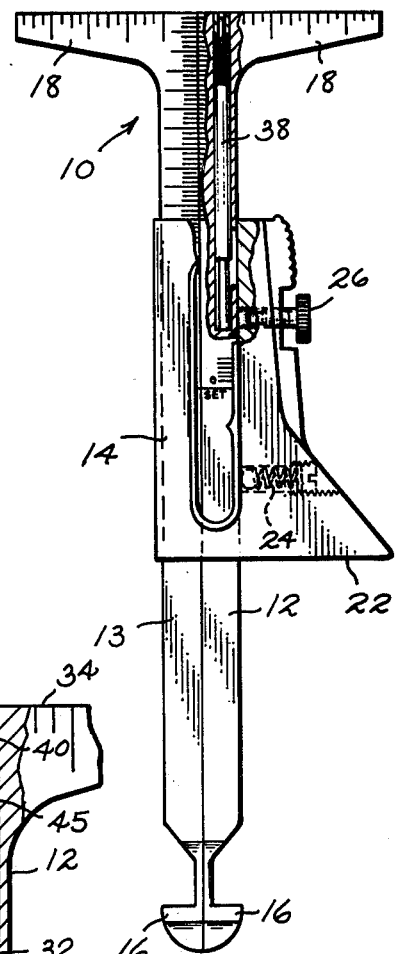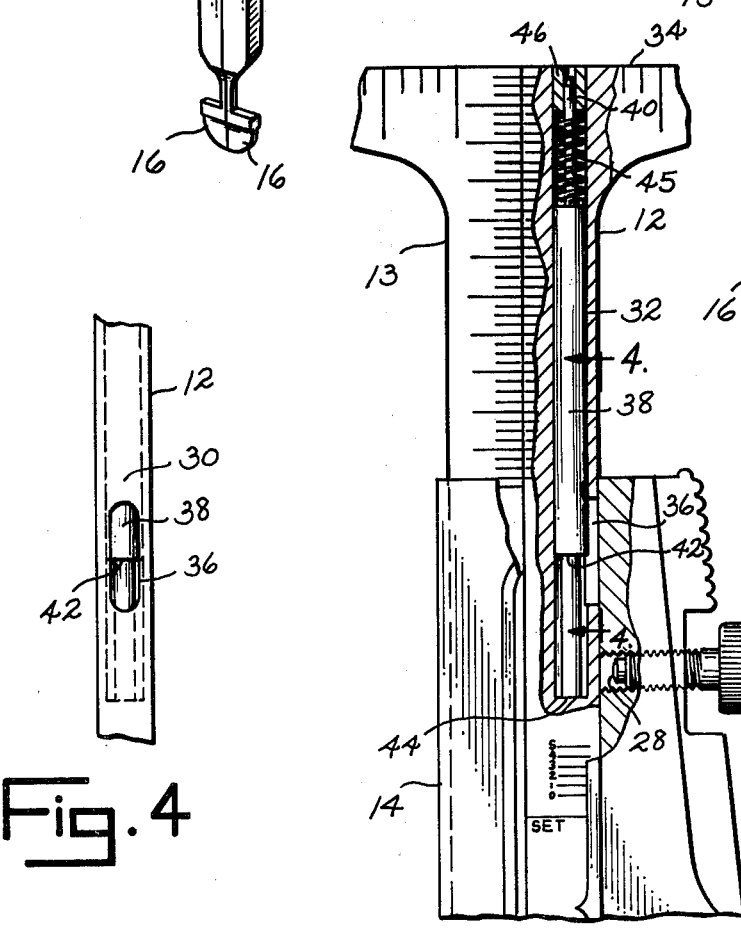

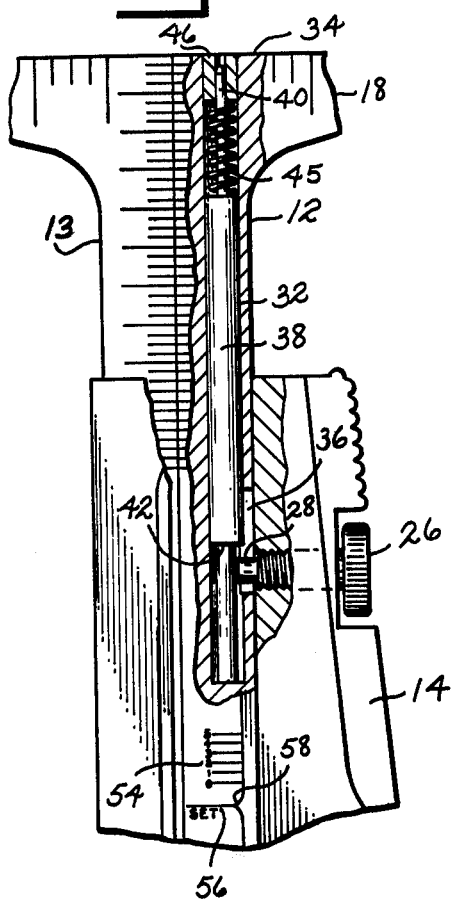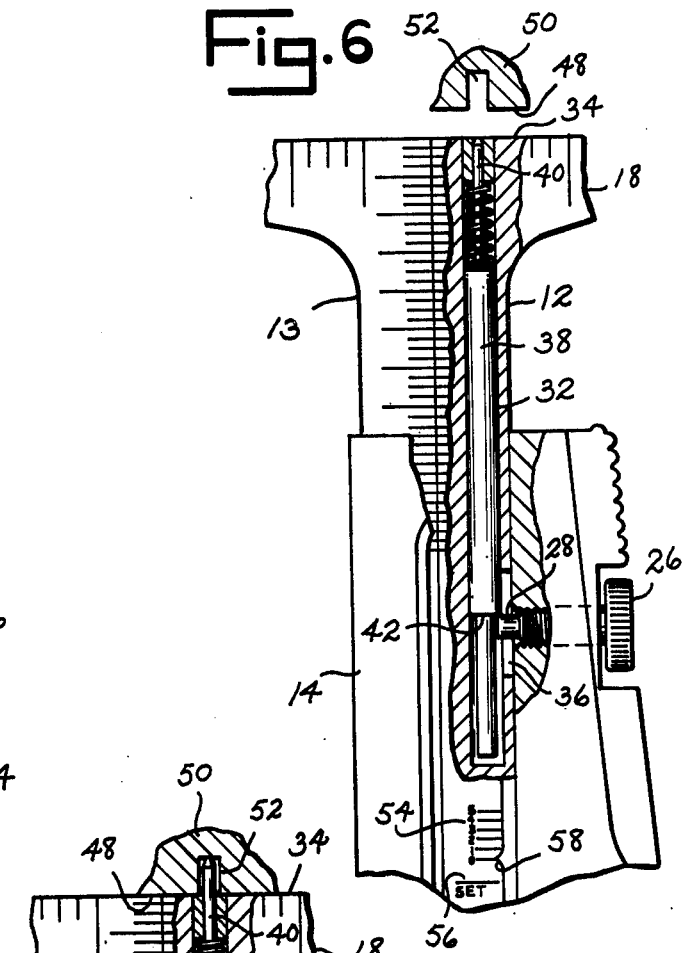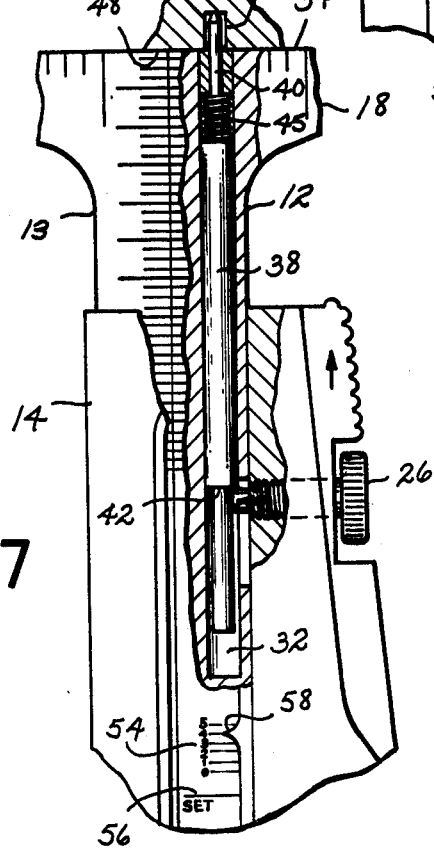

OFFSET GAGING DEVICE INCORPORATING A DEPTH MEASURE FOR BORES OR SHOULDERS

SUMMARY OF THE INVENTION

This invention relates to an improved gage for determining the offset of two end to end positioned structural members in which such improvement constitutes an incorporated gaging device for measuring the depth of bores or similar structural recesses.

The gage of this invention is an improvement upon that gage in U.S. Pat. No. 3,869,801 granted Mar. 11, 1975. The gage includes a pair of side by side bar members secured together for relative longitudinal movement by a shouldered retainer part. One bar member includes a longitudinally extending bore into which is fitted a pin. The pin is shiftable within the bar member bore between a retracted position in which the end of the pin is flush with the end face of the bar member and in an extended position in which the pin protrudes from the bar member end face. The movement of the pin between its retracted and extended positions during measurement of a bore or recess is effected by movement of the retainer part relative to the pin carrying bar member.

Accordingly, it is an object of this invention to provide a gage for measuring the degree of alignment of two tubular members positioned end to end and the depth of bores or recesses in such tubular or similar members.

Another object of this invention is to provide a gage for measuring the offset of two structural members positioned end to end and including a depth indicator for bores or recesses.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is a perspective view of the gage having the depth measuring device of this invention incorporated therein.

FIG. 2 is a side view of the gage having portions of its component parts broken away for purposes of illustrating the construction of the depth measuring device.

FIG. 3 is a fragmentary enlarged detailed view of the gage having portions broken away for purposes of showing the structural components of the depth measuring device.

FIG. 4 is a side view of the gage as seen along line 4—4 of FIG. 3.

FIG. 5 is a fragmentary enlarged view having portions thereof broken away for purposes of showing the depth measuring device in its inoperative position.

FIG. 6 is a fragmentary enlarged view of the gage having portions thereof broken away for purposes of showing the depth measuring device in one operative position.

FIG. 7 is a fragmentary enlarged view having portions thereof broken away for purposes of showing the depth measuring device in a second operative or measuring position.

DESCRIPTION OF THE PREFERRED EMBODIMENT

The preferred embodiment illustrated is not intended to be exhaustive or to limit the invention to precise form disclosed. It is chosen and described in order to best explain the principles of the invention and its application and practical use to thereby enable others skilled in the art to best utilize the invention.

Gage 10 illustrated in the figures includes bar members 12 and 13 which are retained in a parallel relationship with mutually contacting side faces by a shouldered retainer part 14. Each bar member 12, 13 has one end formed into a contact 16 and its opposite end formed into a right angular foot 18. A scale 20 is imprinted upon each bar member 12, 13 so that the amount of longitudinal displacement of one bar member relative to the other can be determined when either contacts 16 or feet 18 of the bar members are utilized to measure the alignment of tubular members placed end to end. Retainer part 14 includes a contact surface 22 which extends in a right angular relationship to the bar members 12 and 13.

The manner of operation of gage 10 as thus far above mentioned is described in U.S. Pat. No. 3,869,801, incorporated herein by reference. Retainer part 14 encloses bar members 12, 13 with each bar member being shiftable relative to each other and to the retainer part. It is preferable that there be sufficient frictional contact between bar members 12, 13 and retainer part 14 to enable relative longitudinal movement between the bar members and retainer part while allowing the bar members and retainer part to remain in a fixed position once a measurement has been made. This enables the gage user to read the results of the measurement. Such frictional contact can be accomplished by the incorporation of a spring 24 or similar biasing means which is carried within retainer part 14 in contact with one of the bar members 12 or 13.

A screw member 26 is threaded into retainer part 14. One function of screw member 26 is to secure or interlock bar members 12 and 13. This is accomplished by turning screw member 26 until its inner end 28 contacts outer edge 30 of bar member 12 to cause bar member 12 to be urged against bar member 13 which in turn is urged into contact with retainer part 14.

Bar member 12 includes a longitudinally extending internal bore 32. Bore 32 extends inwardly from end face 34 of bar member 12 at its foot part 18. A slot 36 is formed in outer edge 30 of bar member 12 into bore 32. A pin 38 fits slideably within 32. The outer end of pin 38 is formed into a narrow probe 40 and the inner end of the pin is slightly reduced in cross section to form a shoulder 42. The length of pin 38 and bore 32 are so correlated that with the inner end of the pin abutting the inner end face 44 of the bore, probe 40 will be slightly recessed from end face 34 of the bar member, as illustrated in FIG. 3. This position of pin 38 will be described for purposes of discussion as its "innermost retracted" position. Pin 38 is normally retained in its innermost retracted position by a suitable biasing means such as helical spring 45 which is located around probe 40 of the pin, contacting the pin at one end and a guide plug 46 at its other end. Guide plug 46 is pressed fitted into bar member bore 32 and is located flush with bar member end face 34.

With pin 38 located in its innermost retracted position, shoulder 42 of the pin will be positioned within slot 36 in bar member 12. If it is desired to shift pin 38 into an extended position in which its probe 40 will protrude from bar member end face 34, screw member 26 carried by retainer part 14 is loosened so as to permit the retainer part to shift relative to the bar members. The retainer part is then pushed toward feet 18 of the bar members until screw member 26 is aligned with slot 36 in bar member 12 just rearwardly of pin shoulder 42. Screw member 26 is then turned into retainer part 14 causing its end 28 to project through slot 36 and into bore 32 at the rear of shoulder 42. Retainer part 14 is then pushed towards bar member feet 18 causing end 28 of the screw member to abut pin shoulder 42 to cause the pin to shift rearwardly relative to bar member 12 with retainer part 14. This combined movement of retainer part 14 and pin 38 relative to bar member 12 will first cause the pin to be positioned in its "outermost retracted" position, as illustrated in FIG. 6, in which the tip of pin probe 40 is flush with end face 34 of the bar member. At this time, foot 18 of bar member 12 would be placed against the outer surface 48 of a structural component 50 having a bore 52 formed therein. With end face 34 of bar member 12 contacting outer surface 48 of structural component 50, retainer part 14 is shifted again toward feet 18 of the bar members 12 and 13 to cause pin 38 to shift relative to bar member 12 with probe 40 of the pin entering bore 52 until contact is made by the probe at the end of bore 52, as illustrated in FIG. 7. Bar member 12 is then lifted from structural component 50 with bar member 12 remaining in a fixed position relative to retainer part 14 and with pin probe 40 remaining in its extended position to indicate the depth of bore 52 of the structural component.

Bar member 12 is provided with scaled indicia 54 and a "set" line 56. Retainer part 14 is provided with an indicator 58. Each line of scaled indicia 54 may represent a selected measurement, such as 1/32 of an inch. The location of scaled indicia 54 and set line 56 relative to indicator 58 is such that when indicator 58 of the retainer part is aligned with the set line, as illustrated in FIG. 5, screw member 26 is aligned with slot 36 in bar member 12 to enable the screw member to be turned into the retainer part with its end 28 entering bar member bore 32 slightly behind pin shoulder 42. As retainer part 14 is pushed towards feet 18 of bar members 12 and 13, screw member end 28 will contact pin shoulder 42 and urge the pin to move from its innermost retracted position to its outermost retracted position shown in FIG. 6 at which time indicator 58 of the retainer part will be aligned with the "o" line of scaled indicia 54 to indicate to the gage user that the tip of pin probe 40 is flush with end face 34 of bar member 12. Further movement of retainer part 14 towards bar member feet 18 will cause pin probe 40 to protrude from bar member end face 34 with the amount of such protrusion being indicated by the alignment of retainer part indicator 58 with scaled indicia 54. As illustrated in FIG. 7 with each scaled indicia line 54 representing 1/32nd of the inch, the depth of bore 52 in structural component 50 is 4/32nd or ⅛th of an inch deep.

Pin 38 may be shifted into its innermost retracted position within bar member bore 32 by either withdrawing screw member 26 from its contacting position with shoulder 42 of the pin, in which case spring 45 in contact with the pin will cause the pin to be urged into the bar member bore or, alternatively, pin 38 may be shifted into its innermost retracted position by simply moving retainer part 14 away from feet 18 of the bar members with pin shoulder 42 remaining in contact with end 28 of screw member 26 until the inner edge of the pin abuts bottom end 44 of the bar member bore.

It is to be understood that the invention is not to be limited to the details above given but may be modified within the scope of the appended claims.

What I claim is:

1. In a gage for measuring the offset of two structural members positioned end to end, said gage including parallel first and second bar members having mutually contacting side faces which extend longitudinally of the bar members, a retainer part joining said bar members with said first bar member and retainer part being shiftable relative to each other, said first bar member being shiftable lengthwise relative to said second bar member over the contacting side faces thereof, contact means carried by said first and second bar members for engagement with said structural members whereby the offset of the structural members is indicated by the relative lengthwise position of the bar members, the improvement wherein said first bar member includes an end face, a bore formed in said first bar member extending lengthwise of the bar member from said end face thereof, a pin carried within said bore and being shiftable therein between an extended position in which one end portion of the pin protrudes beyond said bar member end face to provide a depth measurement and a retracted position in which said pin one end portion is flush with said bar member end face, said retainer part including means for engaging said pin to shift said pin from its retracted position into its extended position as said retainer part shifts relative to said first bar member, said pin engaging means of the retainer part having a release position permitting movement of said first bar member and pin relative to said retainer part and a securement position connecting said pin and retainer part for joint movement relative to said first bar member.

2. The gage of claim 1, wherein said pin engaging means of the retainer part includes a second securement position securing said bar members against movement relative to each other.

3. The gage of claim 1, wherein said pin engaging means of the retainer part is a screw member, said pin including a shoulder part, said screw member contacting said pin shoulder part when in its securement position, said screw member being spaced from said pin when in its release position.

4. The gage of claim 3, wherein said retainer part includes a body member extending about said bar members, said screw member threaded through said body member, a slot formed in said first bar member in communication with said bore and alignment with said screw member, said screw member in its securement position protruding through said slot and into said bore at said pin shoulder.

5. The gage of claim 4, wherein said screw member engages said first bar member in a second securement position spaced from said slot to urge the first bar member against said second bar member and secure said bar members against movement relative to each other.

6. The gage of claim 1 and measurement indicia correlated to the extent of protrusion of said pin one end portion beyond said bar member end face carried upon said first bar member, said retainer part including an indicative mark, said mark being aligned with one of said measurement indicia when said pin is in an extended position to indicate the extend the pin protrudes from said bar member end face.

7. The gage of claim 1 and means normally biasing said pin into a second retracted position in which said pin one end portion is inset within said bore from said bar member end face, said pin engaging means of the retainer part further constituting means for shifting said pin from its said second retracted position into its extended position.

* * * * *